United States Patent
Raby et al.

(10) Patent No.: US 7,199,843 B2
(45) Date of Patent: Apr. 3, 2007

(54) SPECTRAL TRANSLATION FOR VSB COMPENSATION

(75) Inventors: Dean Raby, San Diego, CA (US); Robert Caulfield, Rancho Sante Fe, CA (US)

(73) Assignee: LSI Logic Corporation, Milpitas, CA (US)

( * ) Notice: Subject to any disclaimer, the term of this patent is extended or adjusted under 35 U.S.C. 154(b) by 815 days.

(21) Appl. No.: 10/260,072

(22) Filed: Sep. 30, 2002

(65) Prior Publication Data

US 2004/0061806 A1    Apr. 1, 2004

(51) Int. Cl.
*H04N 5/44* (2006.01)

(52) U.S. Cl. ...................................... 348/725

(58) Field of Classification Search ................ 348/726, 348/725, 720, 555, 554
See application file for complete search history.

(56) References Cited

U.S. PATENT DOCUMENTS

| | | | |
|---|---|---|---|
| 4,833,533 A * | 5/1989 | Augusti et al. .............. 358/523 |
| 5,521,640 A * | 5/1996 | Prater ........................... 348/273 |
| 5,745,187 A * | 4/1998 | Hulyalkar et al. ........... 348/607 |
| 5,805,242 A * | 9/1998 | Strolle et al. ................ 348/726 |
| 5,933,200 A * | 8/1999 | Han ............................. 348/725 |
| 6,026,128 A * | 2/2000 | Goeckler et al. ............ 375/321 |
| 6,046,775 A * | 4/2000 | Jonnalagadda et al. ..... 348/461 |
| 6,147,713 A * | 11/2000 | Robbins et al. ............. 348/555 |
| 6,333,767 B1* | 12/2001 | Patel et al. .................. 348/725 |
| 6,697,098 B1* | 2/2004 | Wang ........................... 348/21 |
| 6,724,331 B1* | 4/2004 | El-Ghoroury et al. ....... 341/118 |
| 2002/0136329 A1* | 9/2002 | Liu et al. ..................... 375/326 |
| 2002/0145680 A1* | 10/2002 | Hong .......................... 348/725 |
| 2003/0145328 A1* | 7/2003 | Rabinowitz et al. .......... 725/72 |

* cited by examiner

*Primary Examiner*—Paulos Natnael
(74) *Attorney, Agent, or Firm*—Conley Rose, P.C.

(57) ABSTRACT

A system for providing spectral compensation for vestigial sideband, VSB, signals with carrier frequency error. The VSB signal is sampled and digitized. The carrier frequency of the digitized signal is translated to a selected IF frequency. A fixed frequency VSB filter is then used to provide spectral compensation for the signal.

19 Claims, 5 Drawing Sheets

SPECTRAL TRANSLATION FOR VSB COMPENSATION

BACKGROUND OF THE INVENTION

The present invention relates to conversion of vestigial sideband signals to base band, and more particularly to providing spectral compensation for vestigial sideband signals having a variable or poorly regulated intermediate frequency (IF).

In order to conserve bandwidth and reduce power requirements, it is common practice to transmit television signals as vestigial sideband, VSB, signals. VSB signals are produced by modulating a signal with a standard double sideband full carrier modulator and then filtering out a portion of the lower sideband before transmission. This reduces the bandwidth and power required to transmit a signal while providing an easily demodulated signal.

In order to obtain an accurate base band signal from a VSB signal, spectral compensation is needed. Generally, this compensation is in the form of a filter having a lower cutoff centered on the carrier frequency, usually the IF frequency. It is therefore necessary to know the IF frequency in order to design an appropriate compensation filter.

There are two "standard" IF frequencies used for cable applications. In the United States the standard is 44 MHz, while in Europe the standard is 36 MHz. Each of these requires the use of a different VSB compensation filter. In addition, IF frequency errors of plus or minus 150 KHz occur as a result of RF modulation errors in the transmitter and errors in the local RF to IF tuner. It would be expensive in terms of component cost and board area for an analog filter solution or silicon area for a digital solution to provide a range of compensation filters capable of providing accurate spectral compensation for VSB signals over this range of IF frequencies.

It would be desirable to provide a system for providing spectral compensation for VSB signals with a single compensation filter.

SUMMARY OF THE INVENTION

In accordance with the present invention, a VSB signal is sampled and digitized. The carrier frequency of the sampled signal is compared to a selected intermediate frequency and the difference is used to translate the signal to the selected intermediate frequency. A VSB compensation filter designed for the selected frequency is then used to provide spectral compensation to the signal. The resulting signal may then be converted to an accurate base band signal.

DETAILED DESCRIPTION OF EMBODIMENTS

As noted above, it has been common practice to transmit television signals in the form of vestigial sideband, VSB, signals. This approach has been and is still used with analog television signals. In order to provide better television video, digital television signal formats have been and are being developed. These digital signals must be transmitted as RF signals which are actually analog signals. However, they are usually broadcast as full double bandwidth signals and not as VSB signals. Both types of signals are usually provided over the same cable television systems. As a result, the receiver at the customer's home must be able to receive both VSB signals for analog channels and the full double bandwidth signals for digital signals.

Figure 1:
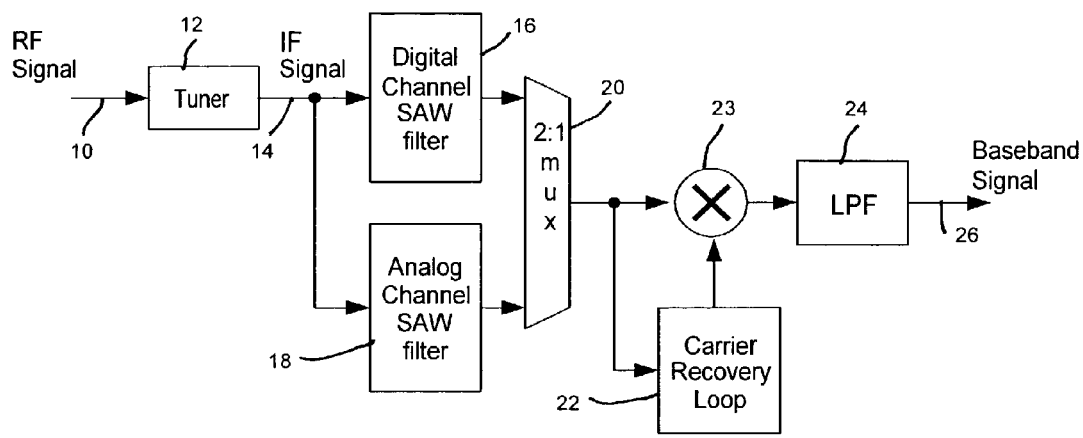
FIG. 1 is a block diagram of a cable television receiver capable of receiving both analog and digital channels.

With reference to FIG. 1, there is illustrated one approach to receiving both analog and digital channels with one receiver. An RF signal containing both analog and digital television signals is received over a cable system 10 by a tuner 12 and converted to an IF frequency at 14. The bandwidth of the IF is normally wider than the spectrum of a single channel to be sure that there is no attenuation of the signal in the tuner 12.

A pair of surface acoustic wave device, SAW, filters 16 and 18 may be used to provide rejection of adjacent channels. Two filters are usually required because the analog channels are in VSB format and require spectral compensation, as discussed in more detail below, but the digital channels do not need this type of filter. The SAW filter 18 for the analog channels may provide this spectral compensation while providing adjacent channel rejection. The digital channel SAW filter 16 needs to pass the full bandwidth of the double sideband digital channel signal and does not provide the spectral compensation needed for VSB signals.

Outputs of the SAW filters 16 and 18 are coupled to a multiplexor 20 which alternately couples either the analog signal or the digital signal to a final stage down converter including a carrier recovery loop 22 and a multiplier 23. The output of the multiplier 23 is filtered through a low pass filter 24 to provide a base band signal 26 at the output of the receiver.

Figure 2:
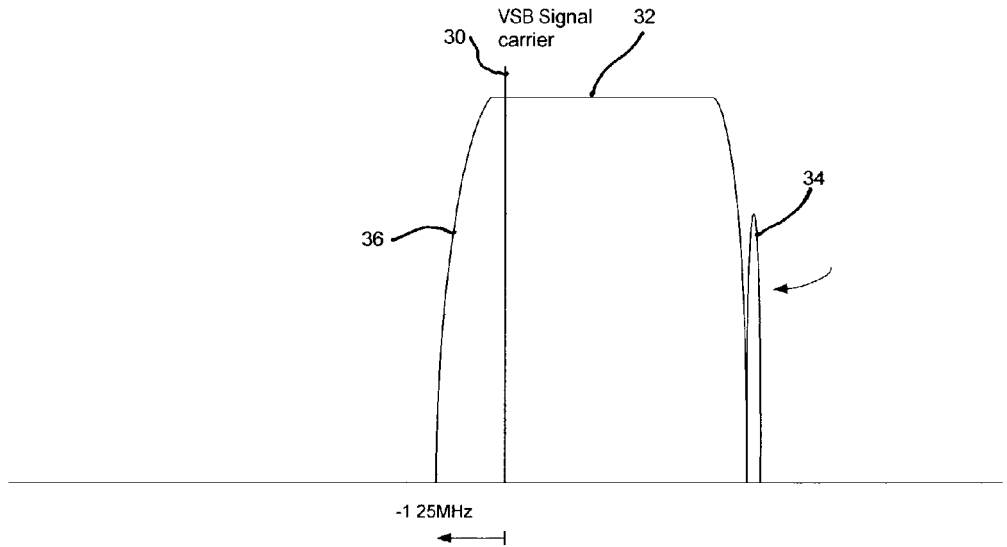
FIG. 2 is a plot of the spectrum of a VSB signal.

With reference to FIG. 2, there is illustrated the spectrum of a typical VSB broadcast television analog signal. As discussed above, the VSB signal has a nominal signal carrier frequency, which is 44 MHz in the United States and is 36 MHz in Europe. The VSB signal includes a complete upper sideband including video portion 32 and sound carrier 34. However, the lower sideband is cut off at about −1.25 MHz as indicated.

Figure 3:
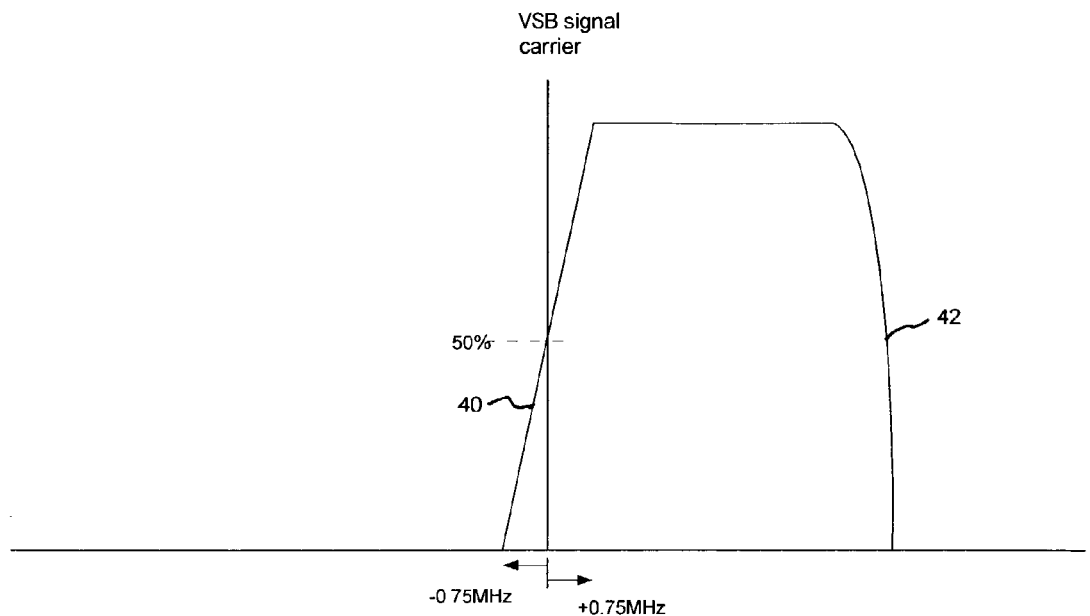
FIG. 3 is a plot of the shape a VSB spectral compensation filter.
Figure 4:
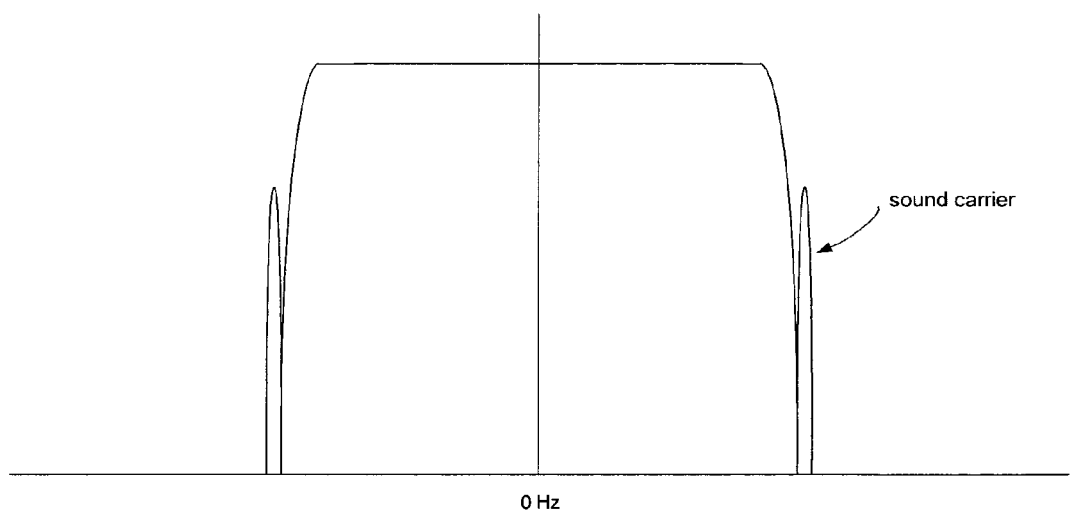
FIG. 4 is a plot of the base band spectrum of a properly demodulated VSB signal.

FIG. 3 illustrates the desired shape of a VSB spectral compensation filter. The SAW filter 18 of FIG. 1 would have this shape. This filter is a band pass filter with a lower cutoff centered on the VSB carrier frequency and covering the range of plus to minus 0.75 MHz. The upper cutoff is above the frequency of the sound carrier 34 of FIG. 2. When this filter is applied to the VSB IF signal, the base band signal illustrated in FIG. 4 results. The important characteristic of this signal is the constant amplitude across the entire video spectrum.

Figure 5:
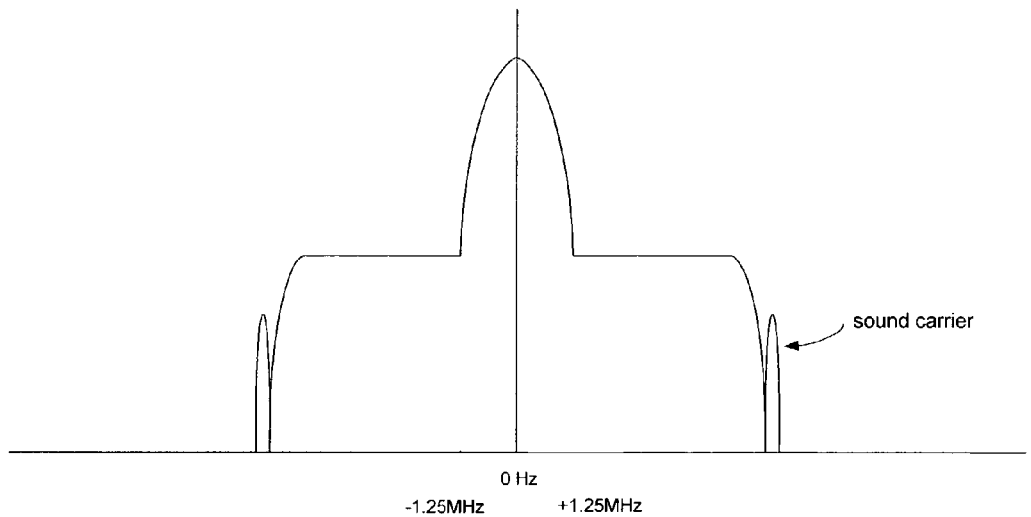
FIG. 5 is a plot of the base band spectrum of a VSB signal which has been demodulated without spectral compensation.

In systems which must receive both analog and digital television signals, it would be desirable to use only one SAW filter. However, the SAW filter for digital channels, for example filter 16 of FIG. 1, must pass both sidebands for typical digital channels. If that type of filter were used to filter a VSB signal, the base band signal shown in FIG. 5 would result. This signal would have severe spectral distortion. In particular, the signals between plus and minus 1.25 MHz would have greater amplitude than higher frequencies.

Figure 6:
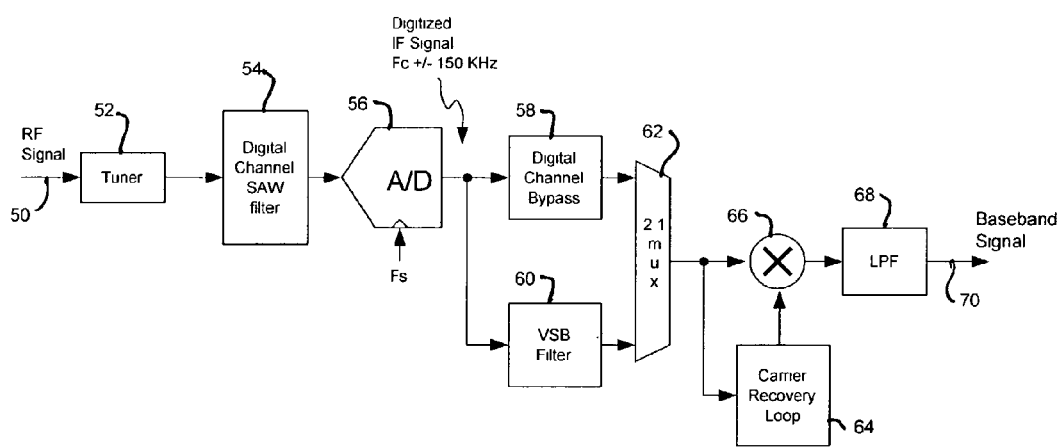
FIG. 6 is a block diagram of a VSB receiver including a fixed VSB filter system.

With reference to FIG. 6, there is illustrated a block diagram of a television receiver for both analog and digital channels which uses one fixed frequency VSB spectral compensation filter. An RF signal containing both analog and digital television signals is received on line 50, e.g. a cable system, by a tuner 52. The tuner 52 down converts the RF signal to an IF signal and couples it to a digital channel SAW filter 54, which may be the same as filter 16 of FIG. 1. The filtered IF signal is coupled to an analog to digital, A/D, converter 56 which provides digitized samples at a rate of $F_S$ at its output. Note that all processing of signals from the output of the A/D converter is preferably performed by a digital signal processor, DSP. The clock of the DSP is used to provide the sampling signal at $F_S$ to the A/D 56. The output from A/D 56 is coupled to both a digital channel bypass 58 and to a VSB spectral compensation filter 60. The outputs of bypass 58 and filter 60 are coupled to a multiplexor 62 which selectively provides one of the two input signals to a base band down converter. The base band down converter includes a carrier recovery loop 64, a multiplier 66 and a low pass filter 68, like the system shown in FIG. 1. The final base band signal is provided on receiver output 70.

Figure 7:
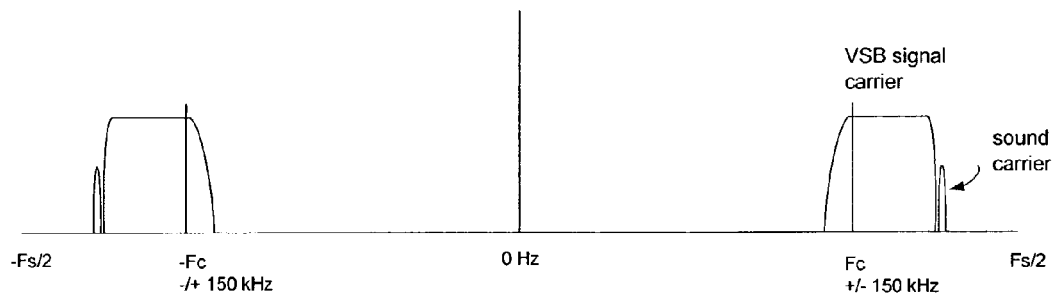
FIG. 7 is the spectrum of a digitized VSB IF signal.
Figure 8:
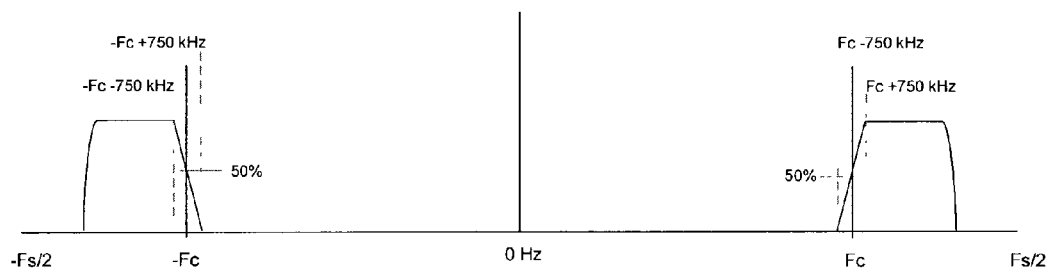
FIG. 8 is a plot of the shape of a fixed VSB compensation filter characteristic for a nominal IF frequency.
Figure 9:
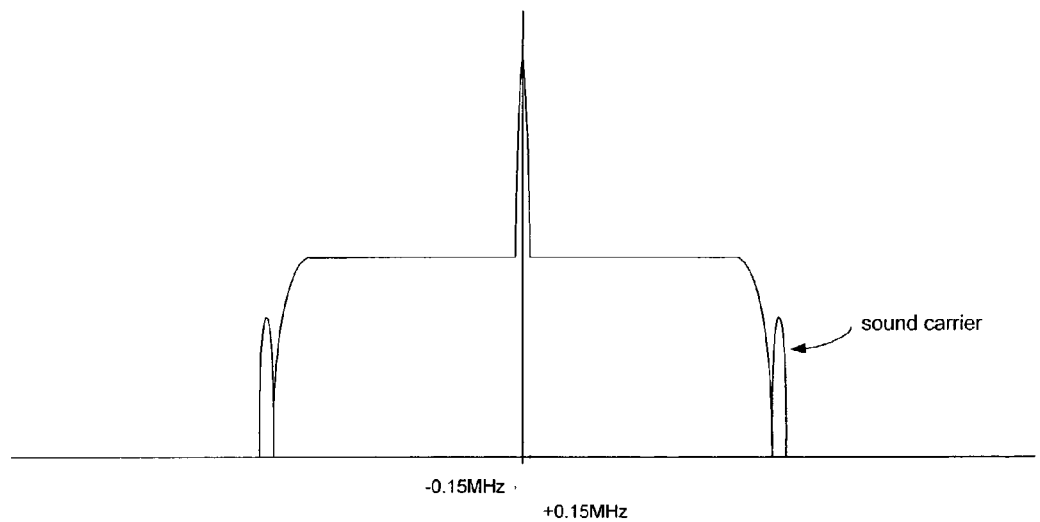
FIG. 9 is plot of the base band spectrum of a VSB signal with frequency error which has been demodulated with a VSB compensation filter set for a nominal IF frequency.

FIG. 7 illustrates the spectrum of the digitized IF signal at the output of the A/D 56 of FIG. 6. As indicated, the VSB picture carrier can have a steady state frequency error of up to plus or minus 150 kHz. The accuracy of the VSB filter 60 depends on knowing the carrier frequency so that the center of the lower cutoff can be set on this frequency. Since the VSB filter 60 is digitally implemented, the filter shape is determined by sets of stored coefficients. However, it is not practical to store coefficient sets for both 36 MHz and 44 MHz carriers and all combinations of those frequencies with the error of plus or minus 150 kHz. If such a set of coefficients were stored, additional circuitry would have to be provided to identify the exact error and select the appropriate coefficient set. As a result, a typical solution would be to compromise and select one fixed VSB compensation fitter design for each IF frequency such as that illustrated in FIG. 8. However, since this filter does not address the issue of the carrier error of plus or minus 150 kHz. the resulting errors will generate distortion in the base band signal. The worst case error, i.e. when the carrier error is at either plus or minus 150 kHz is illustrated in FIG. 9.

Figure 10:
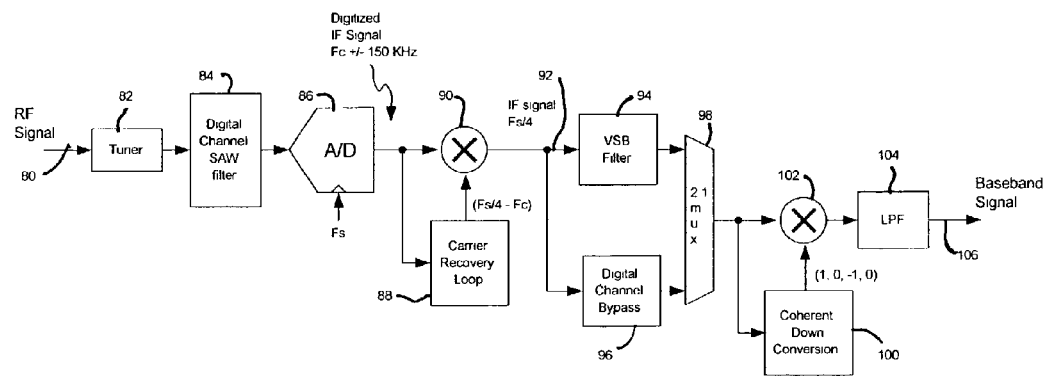
FIG. 10 is a block diagram of a VSB receiver including spectral translation and a fixed VSB filter system.

With reference to FIG. 10, a receiver which uses a fixed frequency VSB spectral compensation filter to provide an accurate base band signal for both analog and digital channels is illustrated. An RF signal containing both analog and digital television signals is received on line 80, e.g. a cable system, by a tuner 82. The tuner 82 down converts the RF signal to an IF signal and couples it to a digital channel SAW filter 84, which may be the same as filter 54 of FIG. 6. The filtered IF signal is coupled to an analog to digital, A/D, converter 86 which provides digitized samples at a rate of $F_S$ at its output. As in FIG. 6, all processing of signals from the output of the A/D converter 86 is preferably performed by a digital signal processor, DSP. The clock of the DSP is used to provide the sampling signal at $F_S$ to the A/D 86.

Figure 11:
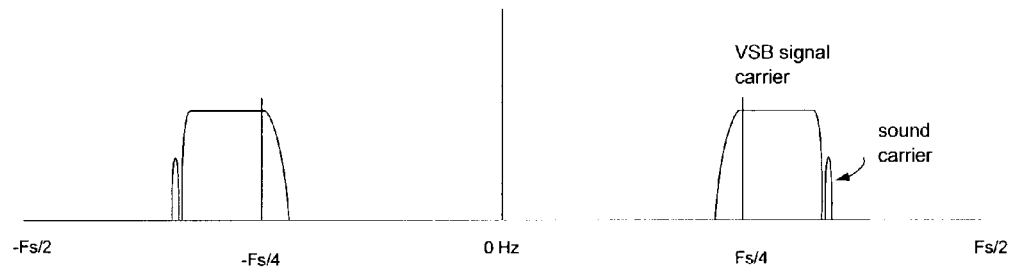
FIG. 11 is a plot of the spectrum of a VSB signal after spectral translation to a preselected frequency.

The signal at the output of A/D 86 has the digitized IF spectrum as illustrated in FIG. 7. In this embodiment, the carrier frequency $F_C$ is translated to a new preselected frequency. For example, it may be translated to the frequency of $F_S/4$ as illustrated in FIG. 11. Referring back to FIG. 10, this spectral translation is performed by carrier recovery loop 88 and multiplier 90. The carrier recovery loop compares the actual carrier frequency of the carrier at the output of A/D 86 to a preselected carrier frequency, e.g. $F_S/4$, and uses the difference to translate the IF frequency to the preselected frequency. As a result, the IF frequency of the signal on line 92 will always be at the preselected frequency.

The signal on line 92 is coupled to a VSB compensation filter 94 and a digital bypass 96. The outputs of filter 94 and bypass 96 are coupled to inputs of multiplexor 98. Multiplexor 98 alternately couples one of the signals from filter 94 and bypass 96 to a final stage down converter including a coherent down converter 100, a multiplier 102 and a low pass filter 104. The final base band signal is provided on the output 106 of filter 104, which is also the output of the receiver.

Figure 12:
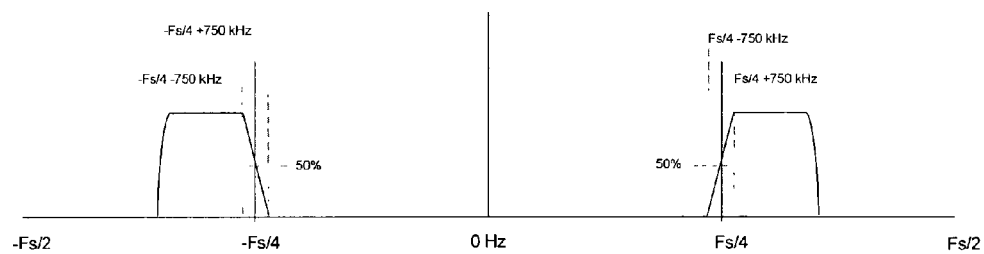
FIG. 12 is a plot of the shape of a fixed VSB compensation filter characteristic for the preselected IF frequency of FIG. 11.

Since the IF signal on line 92 has a known and constant IF frequency, the VSB filter 94 can have a fixed cutoff frequency as illustrated in FIG. 12. With this arrangement, the base band signal for VSB analog television signals on the output 106 will have the desirable spectrum illustrated in FIG. 4.

While the embodiment of FIG. 10 is described with a preselected IF frequency of $F_S/4$, it should be understood that this specific frequency is not required. Any convenient frequency may be used. Since, in this embodiment, the digitized VSB signals are processed in a digital system, e.g. a digital signal processor, it is convenient to select $F_S/4$ which is a digital fraction of the sampling frequency; i.e., $F_S/2$, $F_S/4$, $F_S/8$, . . . $F_S/2^n$.

While the receivers described herein are designed to receive both analog and digital television signals, it should be apparent that the system for spectrally translating and compensating the carrier frequency of a VSB signal is equally applicable to any system using or processing VSB signals. That is, this VSB system may be used for any VSB signals whether or not digital or other types of signals are also present. It could also be useful for signals other than television signals.

It is anticipated that digital television signals may be transmitted as VSB signals, especially for high definition digital television, HDTV, signals. Such HDTV signals typically require more bandwidth than standard television signals. The VSB format conserves bandwidth and may effectively allow an increase in bandwidth of HDTV signals without actually increasing broadcast channel bandwidth. The spectral translation and compensation system described herein will be useful for such signals.

It should be noted that the utility of the spectral translation method described is not limited to just VSB filtering but could also be useful for any IF filter application where translating one IF frequency to a preselected IF frequency would be advantageous. In the embodiment of the invention described herein, this translation to a known fixed frequency allows the use of a single VSB filter 94 having a fixed cutoff frequency.

While the present invention has been illustrated and described in terms of particular apparatus and methods of use, it is apparent that equivalent parts may be substituted of those shown and other changes can be made within the scope of the present invention as defined by the appended claims.

What we claim as our invention is:

1. A system for spectral translation of an analog signal, comprising:
   an analog to digital (A/D) converter having an input for receiving an analog input signal and an output for providing a digital output signal;
   a carrier recovery system receiving the digital output signal, detecting the carrier frequency of said digital output signal, and providing a frequency difference between said carrier frequency and a preselected frequency;
   a mixer for shifting the carrier frequency of said digital output signal to said preselected frequency and providing a shifted output signal;
   spectral compensation filter receiving the shifted output signal and having a lower cutoff generally centered on said preselected frequency;
   a digital channel bypass receiving the shifted output signal; and
   a multiplexor coupled to select the output of said spectral compensation filter or said digital channel bypass.

2. The system of claim 1 wherein all processing of signals from the output of the A/D converter is performed by a digital signal processor (DSP).

3. The system of claim 1 wherein the system is used to process vestigial sideband signals.

4. The system of claim 1 wherein the system is used to process television signals.

5. The system of claim 1 wherein the system is used to process HDTV signals.

6. The system of claim 1 wherein the A/D converter provides digitized samples at its output at a sampling frequency ($F_s$).

7. The system of claim 6 wherein said preselected frequency is a digital fraction of said sampling frequency ($F_s$).

8. The system of claim 6 wherein all processing of signals from the output of the A/D converter is performed by a digital signal processor (DSP) and the clock signal for the DSP is used to provide the A/D converter a sampling signal at the sampling frequency ($F_s$).

9. The system of claim 1 wherein said multiplexor selectively provides the output of said spectral compensation filter or said digital channel bypass to a final down converter.

10. The system of claim 9 wherein said final down converter comprises: a coherent down converter, a multiplier, and a low-pass filter.

11. A system for spectral translation of a vestigial sideband signal, comprising:
    an analog to digital (A/D) converter having an input for receiving an analog vestigial sideband signal and an output for providing a digital vestigial sideband signal;
    a carrier recovery system receiving the digital vestigial sideband signal, detecting the carrier frequency of said digital vestigial sideband signal, and providing a frequency difference between said carrier frequency and a preselected frequency;
    a mixer for shifting the carrier frequency of said digital vestigial sideband signal to said preselected frequency and providing a shifted output signal;
    a vestigial sideband spectral compensation filter having a lower cutoff generally centered on said preselected frequency;
    a digital channel bypass receiving the shifted output signal; and
    a multiplexor coupled to select the output of said spectral compensation filter or said digital channel bypass.

12. The system of claim 11 wherein all processing of signals from the output of the A/D converter is performed by a digital signal processor (DSP).

13. The system of claim 11 wherein the system is used to process television signals.

14. The system of claim 11 wherein the system is used to process HDTV signals.

15. The system of claim 11 wherein the A/D converter provides digitized samples at its output at a sampling frequency ($F_s$).

16. The system of claim 15 wherein said preselected frequency is a digital fraction of said sampling frequency ($F_s$).

17. The system of claim 15 wherein all processing of signals from the output of the A/D converter is performed by a digital signal processor (DSP) and the clock signal for the DSP is used to provide the A/D converter a sampling signal at the sampling frequency ($F_s$).

18. The system of claim 11 wherein said multiplexor selectively provides the output of said spectral compensation filter or said digital channel bypass to a final down converter.

19. The system of claim 18 wherein said final down converter comprises:
    a coherent down converter, a multiplier, and a low-pass filter.

* * * * *